United States Patent
Komurasaki et al.

(10) Patent No.: US 11,597,823 B2
(45) Date of Patent: Mar. 7, 2023

(54) ACRYLIC RUBBER COMPOSITION

(71) Applicant: NOK CORPORATION, Tokyo (JP)

(72) Inventors: Hideto Komurasaki, Kumamoto (JP); Shingo Kawano, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 284 days.

(21) Appl. No.: 17/166,216

(22) Filed: Feb. 3, 2021

(65) Prior Publication Data
US 2021/0253834 A1    Aug. 19, 2021

(30) Foreign Application Priority Data

Feb. 18, 2020   (JP) .............................. JP2020-024939

(51) Int. Cl.
 *C08L 13/00*   (2006.01)
 *C08K 5/00*    (2006.01)
 C08L 27/12     (2006.01)

(52) U.S. Cl.
 CPC ............ C08L 13/00 (2013.01); C08K 5/0025 (2013.01); *C08L 27/12* (2013.01)

(58) Field of Classification Search
 CPC .................................. C08L 13/00; C08K 5/02
 See application file for complete search history.

(56) References Cited

U.S. PATENT DOCUMENTS

2021/0206955 A1 *   7/2021   Komurasaki ........... C08L 71/00

FOREIGN PATENT DOCUMENTS

| EP | 2177564 | * | 2/2009 |
| EP | 2 177 564 A1 | | 4/2010 |
| JP | 2001-354986 A | | 12/2001 |
| JP | 2009-40922 A | | 2/2009 |
| JP | WO2019/230830 | * | 12/2019 |

* cited by examiner

*Primary Examiner* — Robert C Boyle
(74) *Attorney, Agent, or Firm* — Green & Bernstein, P.L.C.

(57) ABSTRACT

An acrylic rubber composition comprising 0.05 to 3.0 parts by weight of a fluorine-containing compound having a melting point of 30 to 100° C., based on 100 parts by weight of acrylic rubber. The acrylic rubber composition that can improve the dispersibility of a processing aid in the compound and the rubber compound handling properties during open roll operation without using a silicone-based processing aid, which causes bleeding of vulcanizates, and that satisfies the various characteristics, such as dimensional stability and heat resistance, of vulcanizates.

10 Claims, No Drawings

ACRYLIC RUBBER COMPOSITION

TECHNICAL FIELD

The present disclosure relates to an acrylic rubber composition. More particularly, the present disclosure relates to an acrylic rubber composition having excellent molding processability.

BACKGROUND ART

Acrylic rubber has excellent heat resistance; however, the raw material price is relatively high. In addition, this rubber has high adhesion, and the compound preparation processability up to the molding process or the releasability during molding is poor, resulting in high processing costs. There are problems in work safety due to these processability.

Various improvement efforts have been made so far to reduce the product costs. As such an improvement method, selection to reduce the raw material costs is considered so that instant results can be obtained; however, it is difficult to reduce the costs with satisfactory raw material quality, and this is often not suitable for ensuring the quality of functional rubber parts.

On the other hand, there is a method for improving processability in order to reduce the processing costs in the production process. In particular, shortening the vulcanization time in the molding process, high releasability, and reduction of burring directly affect the productivity of products; thus, improvement effects for cost reduction are expected. Such an improvement can be achieved by introducing equipment; however, it is not easy because the equipment cost has a great influence on the production cost, and it is often the case that an improvement is achieved by the compounding composition of the rubber compound.

As a method for improving by means of the compounding composition, for example, there is a method of selecting an amine vulcanized acrylic rubber polymer, which is said to have good processability; however, it is difficult to fully exhibit processability for the unique production process in rubber part manufacturers, and a method for improving by adding a processing aid is required. Although there are various processing aids used for such methods, they have different improvement effects. Therefore, it has been difficult to fully satisfy some of the required processability.

In addition, silicone-based processing aids have a high effect of improving processability and are preferably used (Patent Document 1 etc.); however, depending on the use environment of the product, such silicone-based processing aids may be used in or near electronic components, and the contamination thereof cause a problem. Since non-silicone products are often required recently, it may be difficult to easily use silicone-based processing aids.

However, non-silicone processing aids that have been used so far tend to have lower improvement effects, compared with contribution to processability obtained from incompatibility when silicone is used as a processing aid, and to the dimensional stability and heat resistance of vulcanizates due to the heat resistance that can withstand secondary vulcanization. This is because general-purpose non-silicone processing aids have low incompatibility, and the amount thereof added to the compound increases. In addition, such non-silicone processing aids also have poor heat resistance and are thus likely to volatilize due to secondary vulcanization, and it is difficult to satisfy the dimensional stability and various characteristics of vulcanizates.

PRIOR ART DOCUMENT

Patent Document

Patent Document 1: JP-A-2009-40922
Patent Document 2: JP-A-2001-354986

OUTLINE OF THE INVENTION

Problem to be Solved by the Invention

An object of the present disclosure is to provide an acrylic rubber composition that can improve the dispersibility of a processing aid in the compound and the rubber compound handling properties during open roll operation without using a silicone-based processing aid, which causes bleeding of vulcanizates, and that satisfies the various characteristics, such as dimensional stability and heat resistance, of vulcanizates.

Means for Solving the Problem

The above object of the present disclosure can be achieved by an acrylic rubber composition comprising 0.05 to 3.0 parts by weight of a fluorine-containing compound having a melting point of 30 to 100° C., based on 100 parts by weight of acrylic rubber.

Effect of the Invention

In the acrylic rubber composition according to the present disclosure, the processing aid to be added thereto has a melting point of 30 to 100° C., and is thus solid at room temperature, is easy to handle, and melts at the temperature in the kneading process with an open roll, thereby being capable of avoiding poor dispersion of the processing aid. Therefore, this processing aid is easier to handle than silicone-based processing aids, which are liquid or pasty at room temperature.

In addition, the acrylic rubber composition according to the present disclosure exhibits excellent effects that the processability is improved by the addition of a small amount, and that the various characteristics, such as dimensional stability and heat resistance, of vulcanizates can be satisfied in a well-balanced manner.

EMBODIMENTS FOR CARRYING OUT THE INVENTION

As the acrylic rubber, amine vulcanizable group-containing acrylic rubber, peroxide crosslinkable group-containing acrylic rubber, or the like can be used without limitation; however, amine vulcanizable group-containing acrylic rubber is preferably used.

Usable examples of the amine vulcanizable group-containing acrylic rubber include acrylic rubber using as a vulcanizing agent a polyvalent amine, such as carboxyl group-containing acrylic rubber, epoxy group-containing acrylic rubber, or chlorine group-containing acrylic rubber.

The carboxyl group-containing acrylic rubber usable herein is one obtained by copolymerizing at least one of an alkyl acrylate containing an alkyl group having 1 to 8 carbon atoms and an alkoxyalkyl acrylate containing an alkoxyalkyl group having 2 to 8 carbon atoms, with a carboxyl group-containing unsaturated compound.

Usable examples of alkyl acrylate include methyl acrylate, ethyl acrylate, propyl acrylate, isopropyl acrylate, n-butyl acrylate, n-hexyl acrylate, 2-ethylhexyl acrylate, and n-octyl acrylate, as well as methacrylates corresponding to these acrylates. In general, alkyl groups with a longer chain length are advantageous in terms of cold resistance, but are disadvantageous in terms of oil resistance. These characteristics tend to be reversed when the chain length becomes shorter. From the viewpoint of the balance between oil resistance and cold resistance, ethyl acrylate and n-butyl acrylate are preferably used.

Moreover, usable examples of the alkoxyalkyl acrylate include methoxymethyl acrylate, methoxyethyl acrylate, ethoxyethyl acrylate, n-butoxyethyl acrylate, ethoxypropyl acrylate, and the like; 2-methoxyethyl acrylate or 2-ethoxyethyl acrylate is preferably used.

Although the alkoxyalkyl acrylate and the alkyl acrylate can be each used alone, it is preferable that the former is used at a ratio of 60 to 0 wt. %, whereas the latter is used at a ratio of 40 to 100 wt. %. When the alkoxyalkyl acrylate is copolymerized, the balance between oil resistance and cold resistance becomes good. However, if the alkoxyalkyl acrylate is copolymerized at a ratio higher than this range, the normal physical properties and heat resistance tend to decrease.

Examples of the carboxyl group-containing unsaturated compound include monoalkyl (such as methyl, ethyl, propyl, isopropyl, n-butyl and isobutyl) esters of unsaturated dicarboxylic acids, such as maleic acid, fumaric acid, itaconic acid, and citraconic acid; preferably, maleic acid mono-n-butyl ester, fumaric acid monoethyl ester, or fumaric acid mono n-butyl ester is used. In addition to these, unsaturated monocarboxylic acids, such as acrylic acid and methacrylic acid, can also be used. Such a carboxyl group-containing unsaturated compound is used at a copolymerization ratio of about 0.5 to 10 wt. %, preferably about 1 to 7 wt. %, in the carboxyl group-containing acrylic elastomer. If the copolymerization ratio is less than this range, vulcanization is insufficient and the compression set value is deteriorated. In contrast, if the copolymerization ratio is higher than this range, scorching is likely to occur. Since the copolymerization reaction is carried out so that the polymerization conversion rate is 90% or more, the charged monomer weight ratio corresponds almost to the copolymerization composition weight ratio of the generated copolymer.

In the carboxyl group-containing acrylic elastomer, another copolymerizable ethylenically unsaturated monomer can be further copolymerized at a ratio of about 50 wt. % or less. Examples thereof include styrene, α-methylstyrene, vinyl toluene, vinyl naphthalene, (meth)acrylonitrile, acrylamide, vinyl acetate, cyclohexyl acrylate, benzyl acrylate, ethylene, propylene, piperylene, butadiene, isoprene, pentadiene, and the like.

Further, for the purpose of improving kneading processability and extrusion processability, a polyfunctional (meth)acrylate or oligomer with glycol residues in side chains can be further copolymerized for use, if necessary. Examples thereof include di(meth)acrylates of alkylene glycols, such as ethylene glycol, propylene glycol, 1,4-butanediol, 1,6-hexanediol and 1,9-nonanediol; di(meth)acrylates, such as neopentyl glycol, tetraethylene glycol, tripropylene glycol and polypropylene glycol; bisphenol A/ethylene oxide adduct diacrylate, dimethylol tricyclodecane diacrylate, glycerol methacrylate acrylate, 3-acryloyloxyglycerol monomethacrylate, and the like.

The epoxy group-containing acrylic rubber usable herein is one obtained by copolymerizing, in place of the carboxyl group-containing unsaturated compound in the carboxyl group-containing acrylic rubber, an epoxy group-containing unsaturated compound, such as vinyl glycidyl ether, allyl glycidyl ether, glycidyl acrylate, or glycidyl methacrylate, at a copolymerization ratio that occupies about 0.5 to 10 wt. %, preferably about 1 to 5 wt. %, in the epoxy group-containing acrylic elastomer.

Moreover, the chlorine group-containing acrylic rubber usable herein is one obtained by copolymerizing, in place of the carboxyl group-containing unsaturated compound in the carboxyl group-containing acrylic rubber, a chlorine group-containing unsaturated compound, such as chloroethyl vinyl ether, chloroethyl acrylate, vinylbenzyl chloride, vinyl chloroacetate, or allyl chloroacetate, at a copolymerization ratio that occupies about 0.1 to 15 wt. %, preferably about 0.3 to 5 wt. %, in chlorine group-containing acrylic rubber. Among these chlorine group-containing unsaturated compounds, one in which vinyl chloroacetate or the like is copolymerized forms active chlorine group-containing acrylic rubber.

Usable examples of the amine-based vulcanizing agent used as the vulcanizing agent for the amine vulcanizable group-containing acrylic rubber include aliphatic polyamine compounds, such as hexamethylenediamine, hexamethylenediamine carbamate, ethylenediamine, ethylenediamine carbamate, cyclohexanediamine, bis(hexamethylene)triamine, 3,3'-diaminopropylamine, cyclohexanetriamine, hexamethylenediamine-cinnamaldehyde adduct, hexamethylenediamine benzoate and diamino-modified siloxane; alicyclic polyamine compounds, such as 4,4'-methylenebiscyclohexylamine, bis(4-amino-3-methyldicyclohexyl)methane and 4,4'-methylenebiscyclohexylamine-cinnamaldehyde adduct; and aromatic polyamine compounds, such as 4,4'-(α,α-dimethylbenzyl)diphenylamine, 4,4'-methylenedianiline, m-phenylenediamine, 4,4'-diaminodiphenyl ether, p-phenylenediamine, p,p'-ethylenedianiline, 4,4'-(p-phenylenediisopropylidene)dianiline, 4,4'-(m-phenylenediisopropylidene)dianiline, 3,4'-diaminodiphenyl ether, 4,4'-diaminodiphenylsulfone, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenol, bis[4-(4-aminophenoxy)phenyl]ether, 2,2-bis[4-(4-aminophenoxy)phenyl]hexafluoropropane, 1,4-bis(4-aminophenoxy)benzene and 1,3-bis(4-aminophenoxy)benzene.

Such a polyamine compound vulcanizing agent is used at a ratio of about 0.5 to 10 parts by weight, preferably about 0.5 to 5 parts by weight, based on 100 parts by weight of the amine vulcanizable group-containing acrylic rubber. In that case, it is preferable to use a guanidine compound, a sulfenamide compound, a tertiary amine, or the like as a vulcanization accelerator at a ratio of about 0.5 to 15 parts by weight, preferably about 1 to 10 parts by weight, based on 100 parts by weight of the amine vulcanizable group-containing acrylic rubber.

The guanidine compound used herein is, for example, at least one of guanidine, aminoguanidine, 1,1,3,3-tetramethylguanidine, 1,1,3,3-tetraethylguanidine, 1-phenylguanidine, 1,3-diphenylguanidine, triphenylguanidine, 1-benzyl-2,3-dimethylguanidine, 1,3-di-o-tolylguanidine, n-dodecylguanidine, methylolguanidine, dimethylolguanidine, cyanoguanidine, 1,6-guanidinohexane, guanylurea, biguanide, 1-o-tolylbiguanide, di-o-tolylguanidine salt of dicatechol borate, and the like.

A fluorine-containing compound is added as a processing aid to the acrylic rubber. The fluorine-containing compound is used at a ratio of about 0.05 to 3.0 parts by weight, preferably about 0.1 to 2.5 parts by weight, more preferably about 0.3 to 2.0 parts by weight, based on 100 parts by weight of the acrylic rubber. If the compounding ratio of the fluorine-containing compound is less than this range, the object of the present disclosure cannot be achieved. In contrast, if the compounding ratio of the fluorine-containing compound is higher than this range, the compression set characteristics is deteriorated.

Usable examples of such a fluorine-containing compound include the compound represented by the general formula disclosed in Patent Document 2:

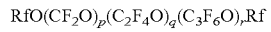

RfO(CF$_2$O)$_p$(C$_2$F$_4$O)$_q$(C$_3$F$_6$O)$_r$Rf

Rf: a perfluoro lower alkyl group having 1 to 5 carbon atoms p, q, r: a positive integer or 0, and p+q+r is not 0.

In practice, commercial products, such as FB962 produced by Daikin Industries, Ltd., and TECNOFLON FPA1 produced by Solvay Specialty Polymers, can be used as they are.

The fluorine-containing compound usable herein is one having a melting point (measured by Differential Scanning calorimetry, according to ASTM D4591) of about 30 to 100° C., preferably about 30 to 80° C. If a fluorine-containing compound having a melting point of higher than this range is used, it cannot be dispersed during preparation of the composition and may result in poor dispersion. In particular, if such a fluorine-containing compound is added using an open roll, the temperature is less likely to rise, and it is thus difficult to handle. In contrast, if a fluorine-containing compound having a melting point of lower than this range is used, it becomes liquid at room temperature, and its handling properties are slightly reduced.

In addition to the fluorine-containing compound, the acrylic rubber composition can be further used in combination with generally used other processing aids, such as fatty acid amides and fatty acid esters, at a ratio of about 1.5 parts by weight or less, preferably about 0.1 to 1.0 part by weight, based on 100 parts by weight of the acrylic rubber so that the total amount of the processing aids, including the fluorine-containing compound, is about 4.5 parts by weight or less.

The copolymer rubber composition containing the above components is suitably compounded with, if necessary, carbon black as a reinforcing agent, a filler or a reinforcing agent such as silica, a plasticizer, a dispersion aid, an antioxidant, and the like.

The composition can be prepared using a known kneading means, such as a roll or a kneader, and vulcanization molding thereof is performed by press vulcanization at about 160 to 190° C. for about 5 to 15 minutes, optionally followed by oven vulcanization (secondary vulcanization) at about 150 to 230° C. for about 1 to 15 hours.

EXAMPLES

The following describes the present disclosure with reference to Examples.

Example 1

| | |
|---|---|
| Carboxyl group-containing acrylic rubber (Noxtite PA-522, produced by Unimatec Co., Ltd.) | 100 parts by weight |
| Carbon black (Seast G-SO, produced by Tokai Carbon Co., Ltd.) | 50 parts by weight |

-continued

| | |
|---|---|
| Dispersion aid (Stearic Acid TST, produced by Miyoshi Oil & Fat Co., Ltd.) | 1.5 parts by weight |
| Antioxidant (Nocrac CD, produced by Ouchi Shinko Chemical Industrial Co., Ltd.) | 2.0 parts by weight |
| Vulcanization accelerator (Nocceler DT, produced by Ouchi Shinko Chemical Industrial Co., Ltd.) | 2.0 parts by weight |
| 4,4-Diaminodiphenyl ether (produced by Tokyo Chemical Industry Co., Ltd.) | 1.0 part by weight |
| Fluorine-based compound being a processing aid (FB962, produced by Daikin Industries, Ltd., melting point: about 40° C.) | 2.0 parts by weight |

The above components other than the processing aid were kneaded using a 1 L kneader and an open roll at 110° C. or lower for 10 to 30 minutes, and the processing aid was then added using an open roll, thereby producing an unvulcanized rubber sheet.

The unvulcanized rubber sheet was compressed at a constant pressure using a press molding machine at 180° C. for 8 minutes to perform vulcanization molding (primary vulcanization) of a slab test piece and an O-ring for fixing (bearing number G25-shaped) described in JIS B 2401-1, and the compression set of the O-ring was measured. Further, the slab test piece and the sample after compression set measurement were subjected to post curing at 175° C. for 15 hours, and the following items were measured and evaluated. As a result, all the items were evaluated as "good".

Roll processability: After the components other than the processing aid were kneaded with a kneader and then kneaded through a 12-inch open roll with a gap of 3 mm, the processing aid was added to prepare a compound. In the operation of removing the compound from the roll surface by turning back with a roll knife and kneading the compound, the roll processability was evaluated in the following manner. Those that could be turned back were evaluated as "good", and those that were sticky and could not be turned back were evaluated as "bad".

Dimensional stability: The volume change rate (%) before and after secondary vulcanization at 175° C. for 15 hours was calculated according to the sample shape and method of JIS K6258 (2016) corresponding to ISO 1817 (2015), and the volume change rate in the formulation without a processing aid was subtracted from this value. A value of less than 0.5% was evaluated as "good" and a value of 0.5% or more was evaluated as "bad".

Dispersibility: The surface of the slab test piece after secondary vulcanization was visually observed. When a smooth surface was confirmed, the dispersion was evaluated as "good". When fine irregularities were confirmed due to the melting point or compatibility of the processing aid, vulcanization inhibition, etc., or when swelling was confirmed, the dispersion was evaluated as "bad".

Bleeding properties: The slab test piece after secondary vulcanization was allowed to stand at room temperature for 24 hours, and the surface was visually observed before and after wiping with a Kimwipe. When no trace of wiping was confirmed, there was no bleeding, which was evaluated as "good". When a trace of wiping was confirmed, there was bleeding, which was evaluated as "bad".

Compression set: According to JIS B2401-1 (2012) corresponding to ISO 3601-1 (2008), a semi-circular sample with a thickness of about 3.1 mm obtained by cutting the G25-shaped O-ring at two points was sandwiched between SUS plates, and placed in an oven at 150° C. while being compressed by 25%. The sample was taken out after 70 hours, and immediately after that, the sample was released from the SUS plates and left at room temperature for 30 minutes. The compression set value (%) was calculated from the change in thickness of outer diameter before and after the test according to JIS K6262 (2013) corresponding to ISO 815-1 (2008) and ISO 815-2 (2008). A value obtained by subtracting the compression set value in the formulation without a processing aid of +2% or less was evaluated as "good", and a value of greater than 2% was evaluated as "bad".

Example 2

In Example 1, the amount of fluorine-containing compound which was a processing aid, was changed to 0.5 parts by weight, all the items were evaluated as "good".

Example 3

In Example 1, the same amount (2.0 parts by weight) of TECNOFLON FPA 1, produced by Solvay (melting point: 58° C. or less) was used as the fluorine-containing compound which was a processing aid, all the items were evaluated as "good".

Example 4

In Example 3, the amount of fluorine-containing compound which was a processing aid, was changed to 0.5 parts by weight, all the items were evaluated as "good".

Example 5

In Example 3, the amount of fluorine-containing compound which was a processing aid, was changed to 0.2 parts by weight, all the items were evaluated as "good".

Example 6

In Example 1, 1.0 part by weight of TECNOFLON FPA1 was used as the fluorine-containing compound, which was a processing aid, and further 0.5 parts by weight of a fatty acid monoamide (O-200, produced by Nihon Kasei Co., Ltd.; melting point: 73 to 75° C.) was used, all the items were evaluated as "good".

Comparative Example 1

In Example 1, the no processing aid was used, the dispersibility and bleeding properties were evaluated as "good," whereas the roll processability was evaluated as "bad". The volume change rate indicating dimensional stability was −3.50%, and the compression set value was 15.

Comparative Example 2

In Example 1, the same amount (2.0 parts by weight) of silicone (WS280, produced by SCHILL & SEILACHER; liquid at room temperature) was used as the processing aid, the bleeding properties was evaluated as "bad", and the other items were evaluated as "good".

Comparative Example 3

In Example 1, the same amount (2.0 parts by weight) of a fatty acid ester (VPA#2, produced by Chemours; melting point: 76 to 82° C.) was used as the processing aid, the bleeding properties and compression set were evaluated as "bad" and the other items were evaluated as "good".

Comparative Example 4

In Example 3, the amount of fatty acid ester (VPA#2), which was a processing aid, was changed to 0.5 parts by weight, the roll processability was evaluated as "bad" and the other items were evaluated as "good".

Comparative Example 5

In Example 1, the same amount (2.0 parts by weight) of a fatty acid ester (Deoflow 821, produced by D.O.G Chemie; melting point: about 60 to 70° C.), which was a processing aid, was used, the bleeding properties was evaluated as "bad" and the other items were evaluated as "good".

Comparative Example 6

In Example 1, the same amount (2.0 parts by weight) of a fatty acid sodium salt (NS-Soap, produced by Kao Corporation) was used as the processing aid, the dispersibility and compression set were evaluated as "bad" and the other items were evaluated as "good".

Comparative Example 7

In Example 1, the same amount (2.0 parts by weight) of a fatty acid monoamide (O-200, produced by Nihon Kasei Co., Ltd.; melting point: 73 to 75° C.) was used as the processing aid, the dimensional stability and compression set were evaluated as "bad" and the other items were evaluated as "good".

Comparative Example 8

In Example 1, the same amount (2.0 parts by weight) of a fatty acid bisamide (L, produced by Nihon Kasei Co., Ltd.; melting point: 156 to 160° C.) was used as the processing aid, the bleeding properties was evaluated as "bad" and the other items were evaluated as "good".

Comparative Example 9

In Example 1, the same amount (2.0 parts by weight) of an aliphatic amine (HT290, produced by SCHILL & SEILACHER; melting point: about 85° C.) was used as the processing aid, the dimensional stability, dispersibility and compression set were evaluated as "bad" and the other items were evaluated as "good".

Comparative Example 10

In Example 1, the same amount (2.0 parts by weight) of an aliphatic amine (Farmin 80, produced by Kao Corporation; melting point: about 49 to 51° C.) was used as the processing aid, the dispersibility was evaluated as "bad", the compression set was not measurable, and the other items were evaluated as "good".

Comparative Example 11

In Example 1, the same amount (2.0 parts by weight) of a polyoxy alkyl ether acid (RL-210, produced by Toho Chemical Industry Co., Ltd.; melting point: about 55° C.) was used as the processing aid, the dimensional stability, dispersibility and compression set were evaluated as "bad" and the other items were evaluated as "good".

Comparative Example 12

In Example 1, the same amount (2.0 parts by weight) of a liquid hydrocarbon (polybutene NS-M15, produced by NOF CORPORATION; liquid at room temperature) was used as the processing aid, the dimensional stability and bleeding properties were evaluated as "bad," and the other items were evaluated as "good".

Comparative Example 13

In Example 1, the same amount (2.0 parts by weight) of a solid hydrocarbon (Wax135, produced by NIPPON SEIRO CO., LTD; melting point: 60° C. or less) was used as the processing aid, the dimensional stability was evaluated as "bad" and the other items were evaluated as "good".

Comparative Example 14

In Example 1, the amount of fluorine-containing compound, which was a processing aid, was changed to 5 parts by weight, the compression set was evaluated as "bad" and the other items were evaluated as "good".

Comparative Example 15

In Example 1, the same amount (2.0 parts by weight) of a fluorine-containing compound (Dynamar FX5911, produced by 3M; melting point: 120° C.) was used as the processing aid, the processing aid was not dispersed, thereby failing to obtain a sample.

The invention claimed is:

1. An acrylic rubber composition comprising 0.05 to 3.0 parts by weight of a fluorine-containing compound processing aids having a melting point of 30 to 100° C., based on 100 parts by weight of acrylic rubber.

2. The acrylic rubber composition according to claim 1, wherein the acrylic rubber is an amine vulcanizable group-containing acrylic rubber.

3. The acrylic rubber composition according to claim 2, wherein the amine vulcanizable group-containing acrylic rubber is carboxyl group-containing acrylic rubber, epoxy group-containing acrylic rubber, or chlorine group-containing acrylic rubber.

4. The acrylic rubber composition according to claim 1, wherein the fluorine-containing compound is the compound represented by the general formula:

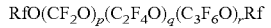

wherein Rf is a perfluoro lower alkyl group having 1 to 5 carbon atoms, p, q and r are individually a positive integer or 0, and p+q+r is not 0.

5. The acrylic rubber composition according to claim 1, wherein other processing aids is further comprised at a ratio of about 1.5 parts by weight or less.

6. A vulcanization molded product of the acrylic rubber composition according to claim 1.

7. The vulcanization molded product according to claim 6, which is used as a sealing material.

8. A vulcanization molded product of the acrylic rubber composition according to claim 2.

9. A vulcanization molded product of the acrylic rubber composition according to claim 4.

10. A vulcanization molded product of the acrylic rubber composition according to claim 5.

* * * * *